(12) United States Patent
Stocq et al.

(10) Patent No.: US 6,306,475 B1
(45) Date of Patent: Oct. 23, 2001

(54) ULTRAVIOLET CONTROL OF THE RELEASE OF A PRESSURE-SENSITIVE ADHESIVE IN CONTACT WITH A SILICONE RELEASE LINER

(75) Inventors: Robert G. Stocq, Bernissart; Jean-Marc C. Francois, Liege, both of (BE)

(73) Assignee: Morgan Adhesives Company, Stow, OH (US)

( * ) Notice: Subject to any disclaimer, the term of this patent is extended or adjusted under 35 U.S.C. 154(b) by 0 days.

(21) Appl. No.: 08/892,814

(22) Filed: Jul. 15, 1997

(51) Int. Cl.[7] ................................. B32B 7/12; C08F 2/50
(52) U.S. Cl. ...................... 428/40.1; 428/41.8; 428/41.9; 428/345; 428/352; 428/354; 428/409; 428/913; 503/226
(58) Field of Search .................................. 428/40.1, 41.8, 428/41.9, 345, 352, 354, 409, 913; 503/226

(56) References Cited

U.S. PATENT DOCUMENTS

| | | | |
|---|---|---|---|
| 4,952,657 | 8/1990 | Riding et al. | 528/27 |
| 5,198,476 | 3/1993 | Kobayashi et al. | 522/31 |
| 5,217,805 | 6/1993 | Kessel et al. | 428/352 |
| 5,560,796 | 10/1996 | Yoshimura | 156/240 |

*Primary Examiner*—Nasser Ahmad
(74) *Attorney, Agent, or Firm*—Renner, Kenner, Greive, Bobak, Taylor & Weber

(57) ABSTRACT

A pressure-sensitive laminate and a method for making the same, for which the release strength between an adhesive layer and a release liner can be selectively varied after the laminate has been manufactured by exposing the interface between the adhesive layer and the release liner to ultraviolet light. The invention allows the selective enhancement of release strength is specific zones, such as by use of a mask. It also allows for the manufacture of a laminate having two face sheets with no dedicated backing sheet, each face sheet acting as the backing sheet for the other.

9 Claims, 5 Drawing Sheets

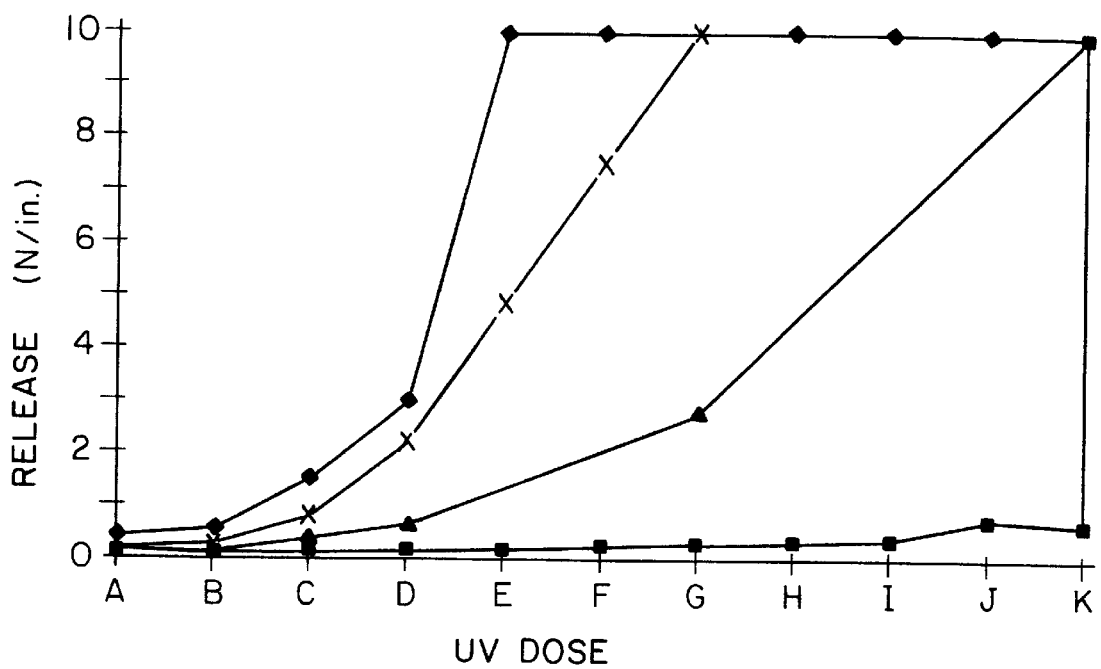
FIG.-7a
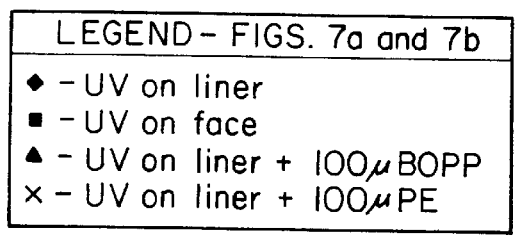
FIG.-7b
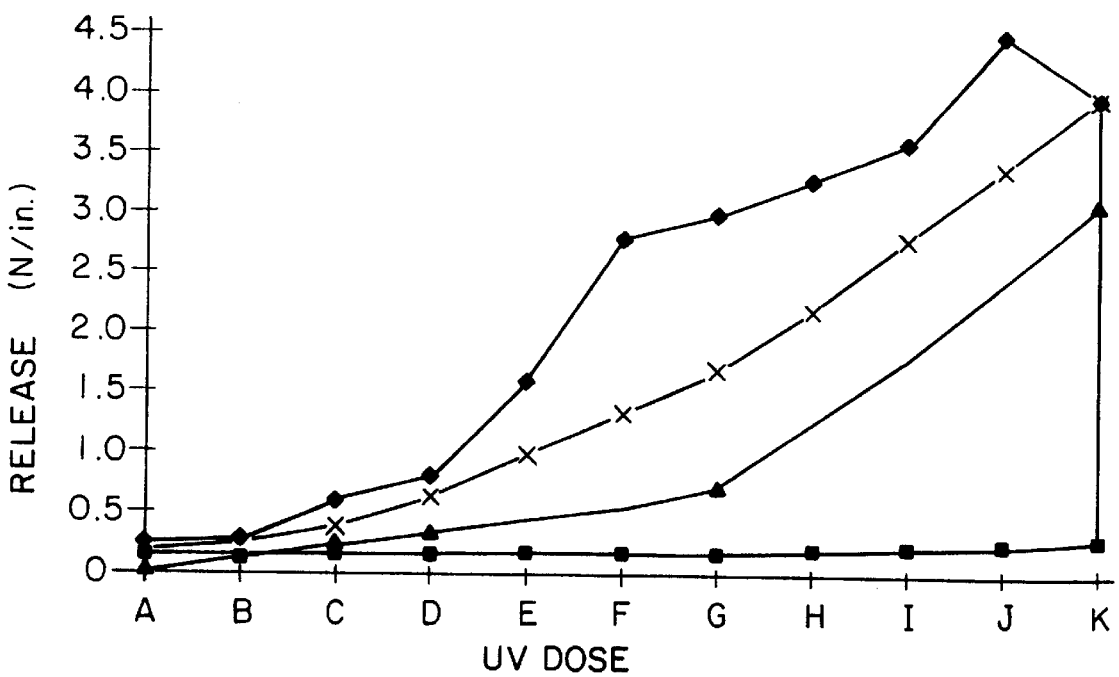

ULTRAVIOLET CONTROL OF THE RELEASE OF A PRESSURE-SENSITIVE ADHESIVE IN CONTACT WITH A SILICONE RELEASE LINER

TECHNICAL FIELD

The present invention generally relates to pressure-sensitive adhesive laminates wherein the silicone layer of a silicone-coated release liner is in direct contact with a pressure sensitive adhesive. More particularly, the present invention relates to regulation of the adhesive-silicone interface in order to control the release strength thereof. Specifically, the invention relates to regulation of such release strength through irradiation of the silicone-adhesive interface by ultraviolet (UV) light.

BACKGROUND OF THE INVENTION

It is generally known that pressure-sensitive adhesives (PSAs) can be applied to the back of a face material, known as a face sheet or face stock, and subsequently be laminated to the silicone coating of a backing sheet to form a pressure-sensitive adhesive laminate, referred to herein simply as a laminate. The adhesive can be applied onto a siliconized backing and then sandwiched onto the face material by lamination. These laminates typically have four layers: a face sheet, a PSA, also referred to herein as an adhesive, a silicone release coating and a backing sheet. The cured silicone is typically bonded strongly to the backing sheet to form what is collectively called a release liner, and the PSA bonds strongly to the face sheet. The PSA and silicone layers, however, bond relatively weakly and can be pulled apart easily.

Typically, it is desirable for the release liner to be easily removable, thereby exposing the free adhesive surface. Therefore, the release strength, which is a measure of the amount of force (the "release force") required to remove the release liner, is generally very low. However, sometimes it is desirable to have higher release strength, or even permanent bonding of the release liner to the face sheet, in selected areas.

The patent literature discloses PSA laminates where the release strength is purported to be "controlled" by altering the composition of the adhesive or the release liner. By exposure of the silicone layer to UV light, bonding of the adhesive-silicone interface can be strengthened for some combinations of adhesive and silicone. Once the composition is manufactured and cured, however, the release strength can no longer be altered. Furthermore, there is no incremental control of release strength.

For example, Reding, U.S. Pat. Nos. 4,952,657, Kobayashi, 5,198,476, and Kessel, 5,217,805, each discloses a UV-cured silicone release coating with a release strength that is controllable by modiifing the silicone composition.

Yoshimura, U.S. Pat. No. 5,560,796, discloses UV curing an adhesive after applying it to a substrate. Although it also discloses coating the substrate with a silicone solution, it does not suggest controllable release of adhesive-silicone interface bonding based on relative amounts of UV exposure.

Another problem encountered in the prior art is that control of the geometric configuration of the areas of specific release strength is difficult to attain. Yet another problem encountered in the prior art is that control of a gradient of release in a specific zone of the PSA laminate is difficult to attain.

SUMMARY OF THE INVENTION

It is therefore an object of the present invention to provide a PSA laminate with an adhesive-silicone interface, the release strength of which can be increased with each increment of UV light exposure.

It is another object of the present invention to provide a PSA laminate that can be masked from UV light in any desired shape, thereby providing zones of high release and low release within the laminate.

It is yet another object of the present invention to provide a PSA laminate that is stable over time in the absence of UV light.

It is still another object of the present invention to provide a PSA laminate whose adhesive can be selectively cleaved by delamination into two sticking labels.

It is another object of the present invention to provide a PSA laminate whose ungummed areas can be designed by irradiation of UV light onto the laminate through a mask.

It is still another object of the present invention to provide a PSA laminate whose release at the two adhesive-silicone interfaces can be independently and selectively increased in specific zones by irradiation of UV light through two masks.

It is still yet another object of the present invention to provide a PSA laminate with a UV-written signature that is invisible until the label is removed from the substrate.

It is yet another object of the present invention to provide a PSA laminate whose free adhesive zones can be selectively designed by UV light.

It is still another object of the present invention to provide a PSA laminate with a gradient of release strength in a specific zone.

It is yet a further object of the present invention to provide a PSA laminate whose release strength can be controllably enhanced long after production of the laminate.

At least one or more of the foregoing objects, together with the advantages thereof over the known art relating to the controlled release strength of PSA laminates, which shall become apparent from the specification which follows, are accomplished by the invention as hereinafter described and claimed.

In general, the present invention provides a pressure-sensitive adhesive laminate comprising an adhesive layer, a first face sheet contacting one side of the adhesive layer, and a first silicone layer contacting the side of the adhesive layer opposite the face sheet wherein the force required to separate the adhesive layer and the first silicone layer increases upon application of ultraviolet light to the interface between the adhesive layer and the first silicone layer. The present invention also provides a method of enhancing the release strength between an adhesive layer and a silicone layer using ultraviolet light.

BRIEF DESCRIPTION OF THE DRAWINGS

FIGS. 7a and 7b are graphs illustrating the effect of UV dose on release strength, measured at a peel rate of 300 mm/min and 80 m/min, respectively.

The illustrations herein are not necessarily to scale.

PREFERRED EMBODIMENT FOR CARRYING OUT THE INVENTION

Figure 1:
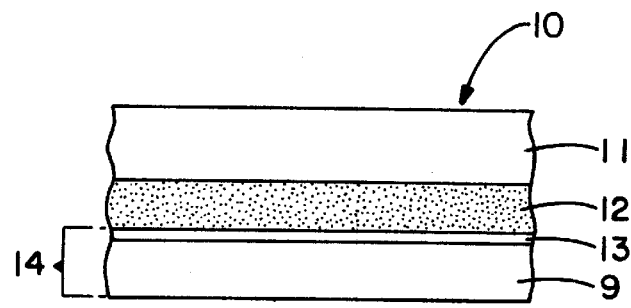
FIG. 1 is an elevational view illustrative of a PSA laminate according to the present invention.

The present invention is generally directed toward a PSA laminate containing an adhesive-silicone interface, the bonding strength of which can be enhanced by the application of UV light. This laminate is best described with reference to the figures. Although the figures are relied on for explanation of the present invention, the present invention should not be limited thereto. With reference to FIG. 1, a laminate 10 is depicted consisting of a face sheet (or face material) 11, which is coated with an adhesive 12, and a release liner 14, which consists of a backing sheet 9 with a silicone coating (or silicone layer) 13, such that adhesive 12 and silicone coating 13 are in contact with each other.

Face sheet 11 can be composed of virtually any material, but generally, as explained below, the adhesive should bond more strongly to face sheet 11 than silicone coating 13. These face sheets are well known in the art and generally include, but are not limited to, paper, vinyl, thermoplastic polymeric films, such as polyethylene, polypropylene, or polyester, or other suitable materials. Paper and polymeric face sheets are often preferred because they can be printed or written on easily.

As described in greater detail below, at least some UV light must be able to pass through either face sheet 11, release liner 14, or both. In one embodiment, where face sheet 11 is transparent to UV light, examples of suitable face sheets include clear polypropylene, biaxially oriented polypropylene (BOPP), clear polyethylene, and other UV-transparent films or papers. It should be noted that as used herein, the terms "clear" or "transparent" refer to a material that is at least partially transparent to UV light.

In another, more preferable embodiment, release liner 14 is transparent to UV light, and face sheet 11 is not. This embodiment is preferred when the site of irradiation is between release liner 14 and adhesive 12 because many of the adhesives contemplated absorb UV light. It also allows the face sheet to have a wide variety of characteristics to satisfy its utilitarian purpose.

Backing sheet 9 can be selected from clear polymeric films, such as those used for the face sheet, glassine paper or any other suitable, preferably UV-transmissive material. More preferably it consists of clear BOPP, polypropylene, or clear polyethylene.

While it is presently contemplated that the release coating is silicone-based, such as the silicone layer 13, one skilled in the art would realize that the concept of the present invention extends to using a release liner based on something other than silicone. When the release layer is silicone-based, it is preferably from about 50 to 100 percent silicone, and more preferably from about 90 to 100 percent silicone.

It is also preferable that silicone coating 13 contain carbonyl derivatives of silicone including, but not limited to, acrylates, methacrylates, ethers and esters. More preferably, the silicone layer contains acrylated silicones such as Tego 726, Tego 711, or a combination thereof, which can be obtained from Th. Goldschmidt AG of Essen, Germany, and an initiator, such as Darocur 1173, which can be obtained from Ciba-Geigy. Alternative silicones suitable for silicone coating 13 include Tego 704, 705, 706, 707, 711, 712, 725, and 726. The catalyst or initiator, such as Darocur 1173, is UV reactive. Moreover, although the catalyst is preferably present in the silicone, the catalyst could be in the adhesive, provided that the bond at the interface between the adhesive and the silicone strengthens upon UV exposure.

The system preferably contains a mixture of Tego 726 and Tego 711 at a weight ratio between about 1:1 and about 9:1. More preferably, the ratio of Tego 726 to Tego 711 is from about 3:2 to about 5:1. Even more preferably, the ratio is from about 2:1 to about 3:1. The exact ratio determines the characteristic release value of the laminate. That release value may, according to the invention, be modified by subsequent exposure of the interface of the adhesive and release layer to UV light. The amount of Darocur 1173 used is from about 0.1 to about 10% by weight of the total mixture, preferably from about 0.5 to about 5%, and more preferably from about 1 to about 3%.

The amount or "dose" of UV light which reaches the interface depends on many factors, described in more detail later herein. Although radiation with wavelengths in the UV range is preferred, one of ordinary skill in the art would realize that the present invention can be practiced using a reactive initiator that will cause bonding between the adhesive and silicone layers upon irradiation at any suitable wavelength.

With further reference to FIG. 1, the strength of the bond between adhesive 12 and silicone coating 13 increase with exposure to UV light. The adhesive can be selected from water-based or solvent-based acrylics, water-based or solvent-based rubbers, hot melt acrylics or rubbers, latexes, or other suitable adhesives. Examples of suitable adhesives include Acronal DS 3458 (BASF) or a mixture of 82.5 weight percent Acronal V205 (BASF) and 17.5 weight percent Snowtack 352A (Akzo-Nobel).

Figure 2A:
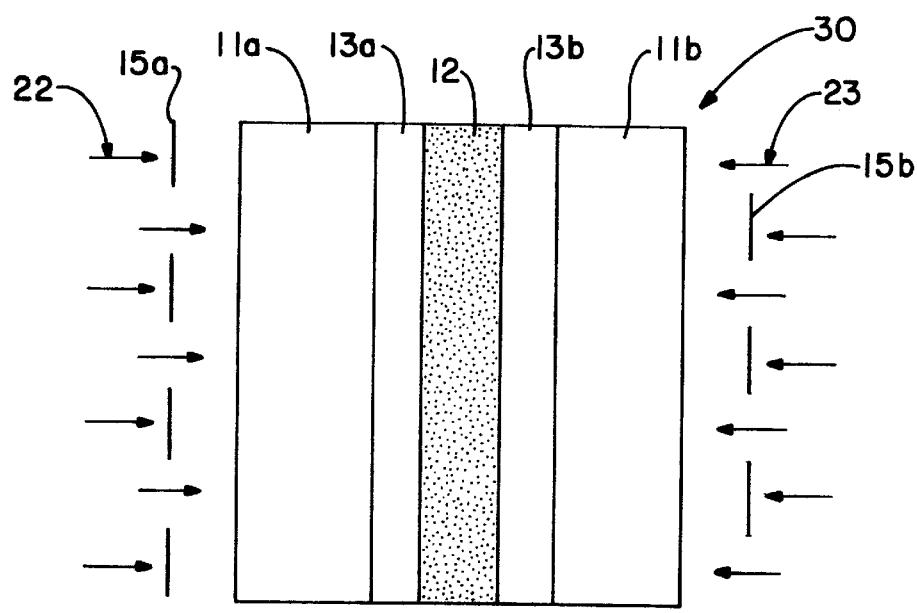
FIGS. 2a and 2b are illustrative of a PSA laminate without a backing sheet before and after delamination, respectively.
Figures 2B, 2C:
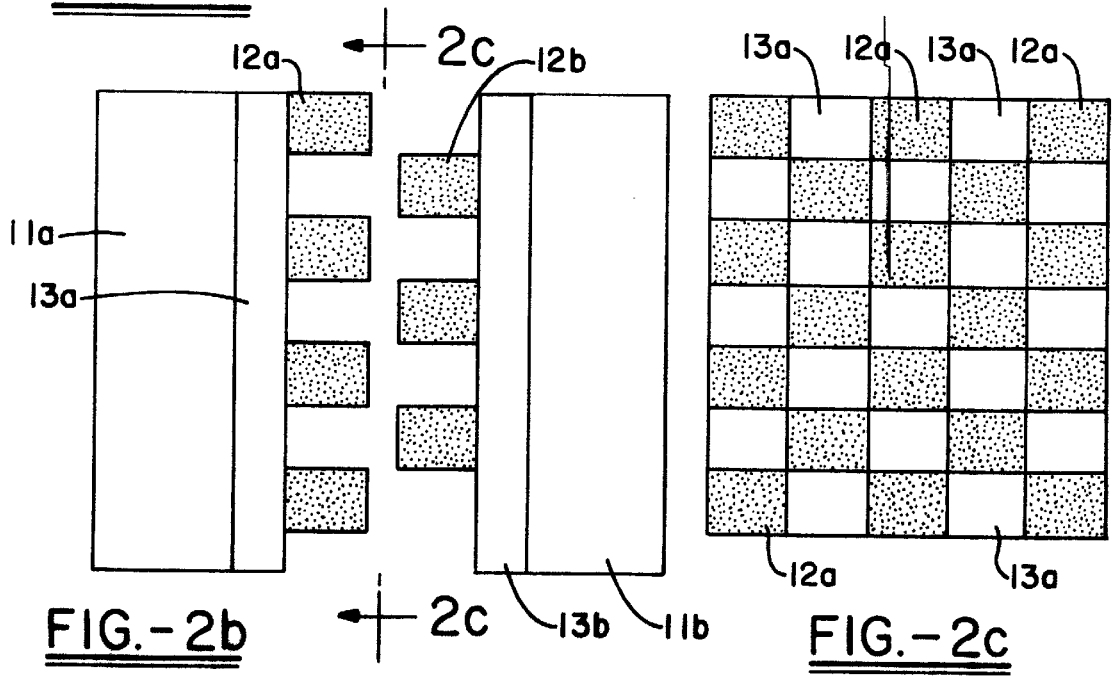
FIG. 2c illustrates the laminate after delamination, as seen at line 2c—2c of FIG. 2b.

Another embodiment of the present invention, in the form of a double-faced laminate 30, is depicted in FIGS. 2a and 2b. This embodiment consists of the following sequence of layers: a first series of square opaque masks 15a, a first face sheet 11a, a first silicone coating 13a, an adhesive 12, a second silicone coating 13b, a second face sheet 11b, and a second series of square opaque masks 15b. Between any two square masks lies a square space or void of equal size, thereby forming a two-dimensional "checkerboard" pattern of masks with gaps or spaces between therm as shown in FIG. 2c.

For this particular embodiment, it is preferable that the face sheets and silicone layers can transmit UV light, but the adhesive layer and masks cannot. As shown in FIG. 2a, the two series of masks are arranged such that the spaces between masks 15a are aligned with masks 15b, and the spaces between masks 15b are aligned with masks 15a.

UV light is then flashed or strobed to give the desired exposure to the adhesive-silicone interface. The UV rays from sources on both sides of laminate 30 are directed normal to each of face sheets 11a and 11b, as indicated by arrows 22 and 23 in FIG. 2a In the spaces or holes of either masks 15a or 15b, the UV light from each source can reach only the closest of the two interfaces due to the non-transmitting adhesive layer. The adhesive may be inherently non-transmitting or made so by the addition of UV-absorbing materials.

The spaced masks produce a mutually exclusive alternating, checkerboard pattern of high release strength and low release strength at both adhesive-silicone interfaces. Since the checkerboard pattern at one interface is offset by one row from the checkerboard pattern at the other interface, delamination results in two substantially identical adhesive-exposing face sheets 11a, 11b with silicone coatings 13a, 13b and layers of adhesive 12a, 12b, as shown in FIG. 2b. Either of the adhesive-bearing face sheets can then be applied to substrates, such as in the case of an ordinary label.

Alternatively, the face sheet and silicone coating can be optionally removed after application to a substrate, effecting a transfer of free adhesive to the substrate. Provided that the adhesive-substrate bond is stronger than the adhesive-silicone bond, when the face sheet is removed, the silicone coating will remain with the face sheet and the free adhesive will remain attached to the substrate. The advantages of being able to apply a free adhesive in this manner include the ability to produce special mounting products, such as concentric zones of adhesive, that heretofore have been technically or economically impractical or difficult to produce.

Figure 3A:
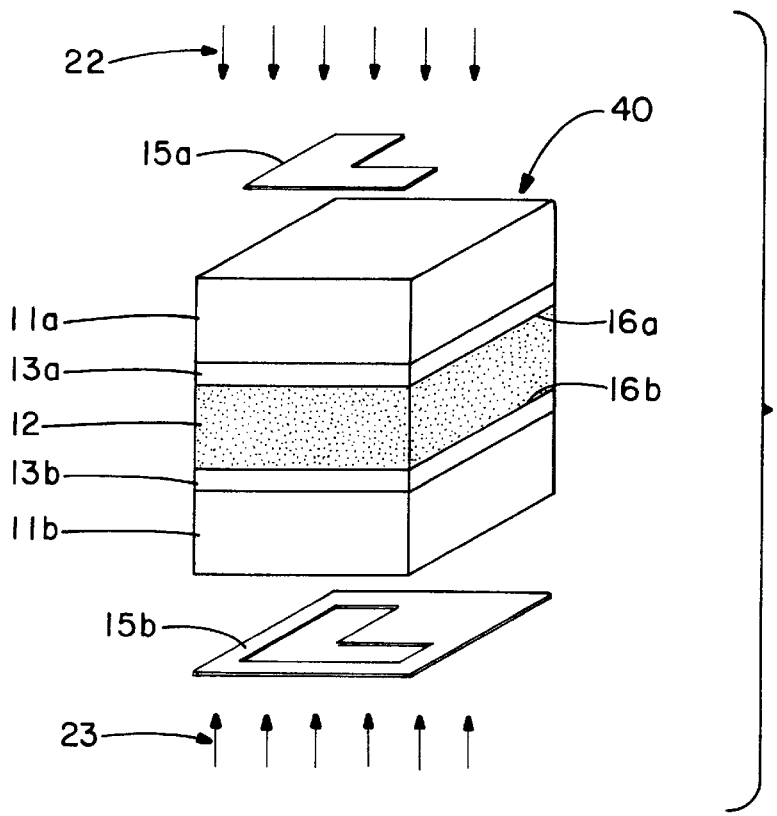
FIGS. 3a and 3b are perspective views illustrative of an "L"-shaped mask as may be applied to a PSA laminate, showing before and after delamination, respectively.

Other mask-gap patterns are possible. For example, one alternative to the checkerboard pattern is depicted in FIG. 3a showing an L-shaped mask 15a interposed between UV rays, indicated by the arrows 22, and a face sheet 11a of a five-layer laminate 40 that also includes first silicone coating 13a, an adhesive 12, a second silicone coating 13b, and a second face sheet 11b. A complementary mask 15b—one that has an L-shaped UV-transparent area or aperture—is interposed between UV rays 23 and face sheet 11b, such that L-shaped mask 15a is aligned with the L-shaped shaped aperture in mask 15b.

Figure 3B:
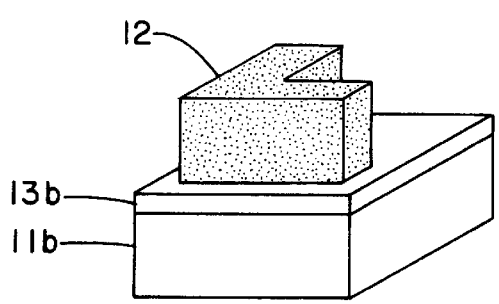

As shown in FIG. 3b, delamination of laminate 40 results in an L-shaped adhesive on silicone layer 13b of face sheet 11b; delamination also results in an L-shaped void, not shown, in the adhesive attached to silicone 13a of face sheet 11a. Either of these two face sheet-silicone-adhesive tri-layers can be applied to a substrate to produce two complementary labels, or, as described above, the silicone-coated face sheet can be removed to generate an L-shaped free-adhesive pattern. One example of a possible use of the L-shaped free-adhesive pattern is the transfer of the free film of adhesive onto a material, the surface of which has an L shape. This process of the invention can be used to make such laminates in rolls without any die-cutting as required by the prior art.

An example of a use for the L-shaped hole in the adhesive of the face sheet-silicone-adhesive tri-layer, which exposes the underlying silicone coating inside the "L", is packaging small items. The L-shaped hole in the adhesive—or more likely a circular or rectangular hole—provides a specific shape that can be placed over an item. The borders adhere to the substrate while the exposed L-shaped silicone coating does not adhere to the packaged items.

An L-shaped adhesive, like that described above, can also be obtained by manipulating the relative release strength of the adhesive-silicone interfaces 16a and 16b shown in FIG. 3a. Interface 16a is where adhesive 12 contacts silicone coating 13a, and interface 16b is where adhesive 12 contacts silicone coating 13b. Interface 16a preferably has a low release strength and interface 16b preferably has an intermediate release strength. It is unimportant how this is achieved, whether by heat, composition, UV light, or other technique.

UV light is then applied, as shown by arrows 22, only to face sheet 11a past L-shaped mask 15a. The result, shown in FIG. 3b, is that an L-shaped portion of adhesive 12 remains attached to silicone coating 13b upon delamination. This occurs because interface 16a retains its low release strength within the area directly beneath the L-shaped mask, but the unmasked areas of interface 16a become high release strength areas due to UV exposure. With respect to interface 16b, the entire interface remains at an intermediate release strength because the non-transmissive adhesive prevents any UV light from reaching interface 16b or because silicone 13b is insensitive to UV light.

Therefore, upon delamination, face sheet 11b and silicone layer 13b will carry an L-shaped area of adhesive 12 because the release strength is higher in this region at interface 16b (intermediate) than at interface 16a (low). On the other hand, the area of adhesive 12 outside the L-shaped area will remain attached to silicone 13a because the release strength is higher in this region at interface 16a (high) than at interface 16b (intermediate).

Heretofore in the art, specially shaped adhesive-backed face sheets were obtained by die-cutting the laminate to the desired shape, and removing the release liner. Using UV light to selectively enhance the release strength, rather than cutting the adhesive, eliminates the cost of the die cutting tool, eliminates the problem of adhesive sticking to the die, and greatly enhances the range of possible adhesive shapes. Small dots and narrow lines, for example, are difficult or impossible to produce by die-cutting, but easy to produce according to the present invention.

Figure 4A:
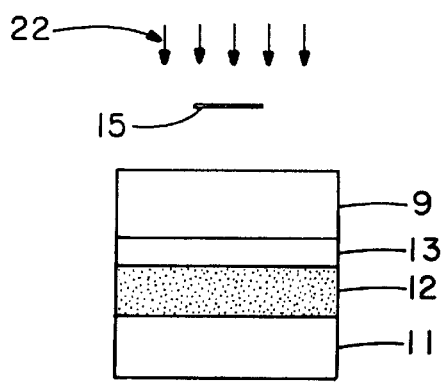
FIGS. 4a and 4b are elevational views illustrative of a PSA laminate that results in selectively gummed areas, showing before and after delamination, respectively.
Figure 4B:
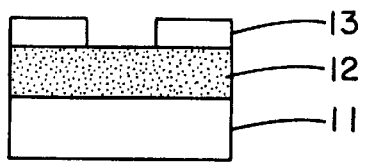

Another embodiment of the present invention is depicted in FIGS. 4a and 4b. This laminate is similar to that described in FIGS. 3a and 3b, but the laminate depicted in FIGS. 4a and 4b has four layers rather than five. As shown in FIG. 4a, a mask 15 allows UV light, represented by arrows 22, to penetrate the laminate only at the periphery. Delamination exposes adhesive only in the center area, as shown in FIG. 4b. One advantage of having an ungummed periphery is to make removal of the laminate from a substrate easier by allowing fingers or a tool to slip under and grab the laminate. The following embodiment is similar to that described above, but the ungummed area is in the center of the laminate rather than the periphery.

Figure 5A:
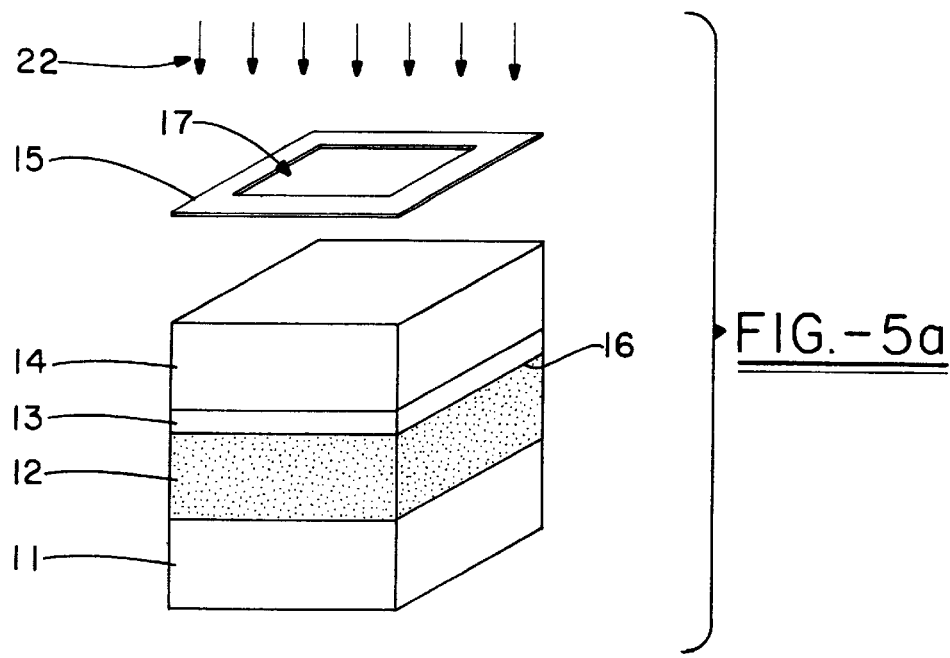
FIGS. 5a and 5b are perspective views illustrative of a holed mask, as may be applied to a PSA laminate, showing before and after delamination, respectively.
Figure 5B:
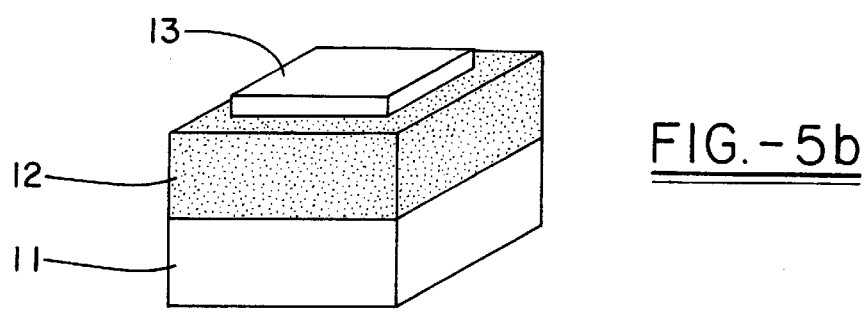

The embodiment, depicted in Figs. 5a and 5b, is primarily envisioned as a packaging device. A mask 15 contains a UV transparent area or hole 17 that can be rectangular, as shown, or any other shape. UV light, represented by arrows 22, penetrates the laminate only through hole 17. The UV rays pass through a transparent backing sheet 14 and then a transparent silicone coating 13, thereby reaching an interface 16 between silicone coating 13 and an adhesive 12 that is adhered to a face sheet 11.

An application of UV light to interface 16, followed by delamination, results in an adhesive layer bearing a silicone rectangle. Placing the device over an item allows the adhesive borders to adhere to the substrate while the silicone-coated rectangle does not adhere to the packaged item.

For all of the aforementioned embodiments, the PSA laminates can be processed in rolls because they can be made in continuous sheets or webs and because the adhesive is not exposed. Many benefits arise from this capability, including the elimination of a need for delamination and relamination, thus preventing contamination of the adhesive and distortion of the laminate.

Figure 6A:
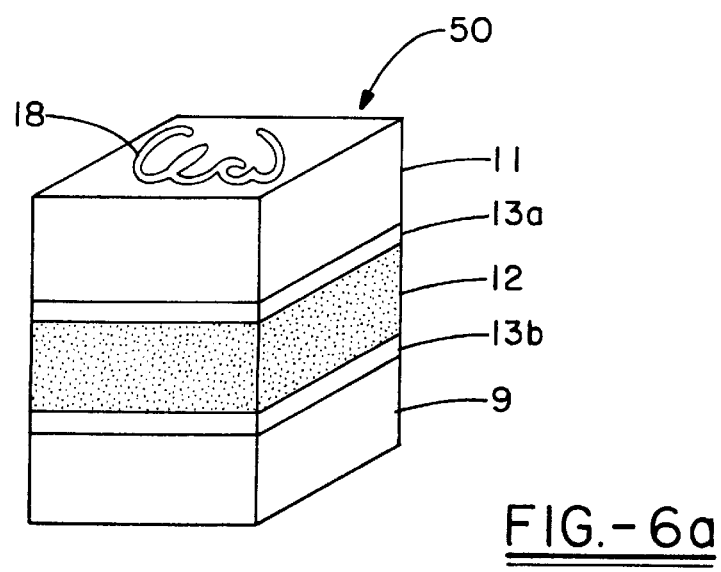
FIGS. 6a and 6b are perspective views of a security label containing a UV signature.
Figure 6B:
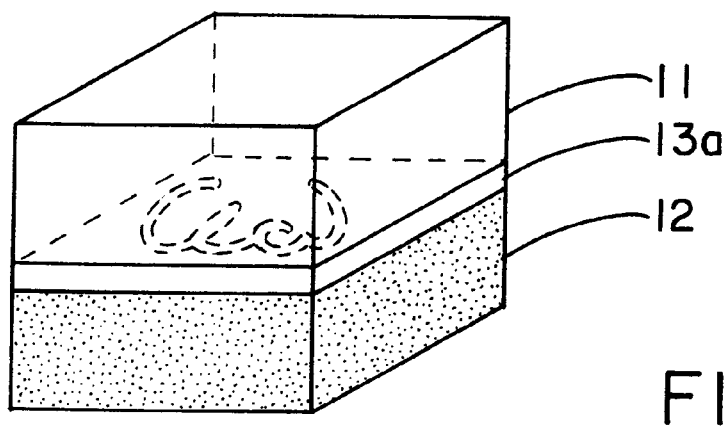
Figure 6C:
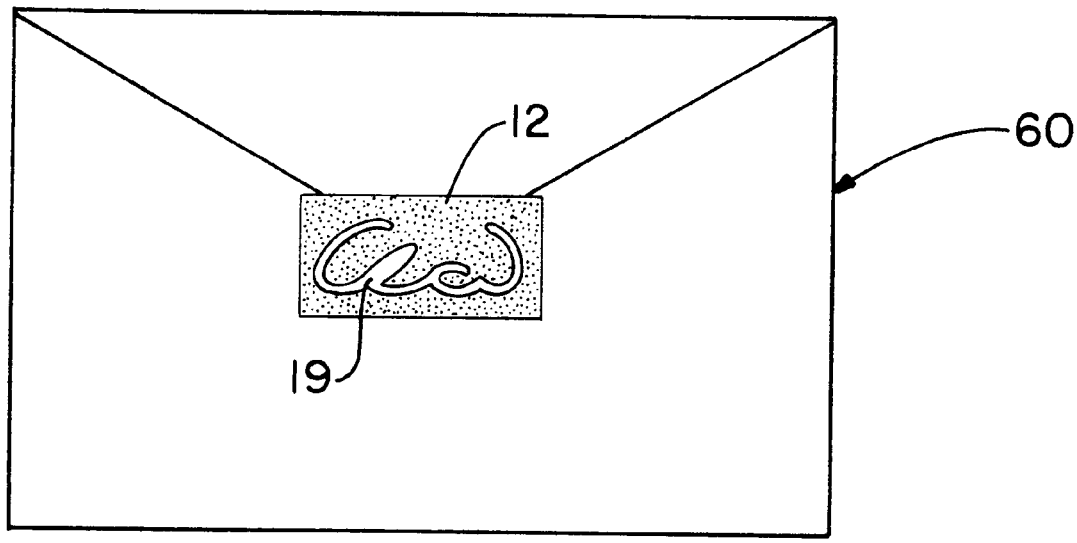
FIG. 6c is a plan view illustrative of the application of the label to an envelope.

Another application of the invention is to provide high security labels, depicted in FIGS. 6a, 6b and 6c. FIG. 6a shows a label consisting of a five-layer laminate 50, like that shown in FIG. 3a, with a face sheet 11, a silicone coating 13a, an adhesive 12, a second silicone coating 13b, and a backing sheet 9. The interface between silicone 13a and adhesive 12 has a medium release value, and the interface between silicone 13b and adhesive 12 has a low release value. It should be noted that in this embodiment, as in other embodiments where only one of multiple interfaces are irradiated, only the irradiated interface requires a UV-reactive silicone.

Face sheet 11 is signed by the sender using a UV-emitting pen to produce a "UV signature" 18. As a result, adhesive 12 bonds strongly to silicone coating 13a in the pattern of signature 18. Therefore, when laminate 50 is delaminated, as shown in FIG. 6b, the entire layer of adhesive remains attached to silicone coating 13a and face sheet 11.

The resulting tri-layer of face sheet-silicone-adhesive is then used to seal an envelope containing confidential documents with the signature of the sender written in ink on the face sheet. The ink signature can be done separately from the UV signature. Face sheet 11 and silicone coating 13a are then removed by the receiver, taking with it the strongly bound adhesive signature and leaving behind a signature-shaped hole in adhesive 12 on the envelope seal, as shown in FIG. 6c. The signature-shaped adhesive attached to silicone coating 13a, preferably colored to increase its visibility, can then be compared to the original signature of the sender.

In general, the preferred means of controlling the dose of UV light is by putting a substance, such as a mask or an ink, between the UV source and the laminate. Examples include the use of opaque printing, a fixed or moving mask, or combinations thereof. Furthermore, it is sometimes desirable to have a gradient of release forces. In one embodiment, this is achieved by printing a variable density of UV-absorbing ink on the UV-transmitting material In another embodiment, a gradient is created by putting between the UV lamp and the laminate either a mask that gradually absorbs increasing amounts of UV light or a gradient of the amount of UV-absorbing ink. Therefore, later portions of laminate will gradually undergo diminished UV exposure despite a constant output by the UV source. It should be noted that it is envisioned that typically a laminate of the present invention is processed as a continuous sheet or web that moves along rollers, and the source of UV light is fixed at one point along the path of the web.

Although wishing not to be bound by any particular theory, it is believed that the silicone-adhesive interfaces of the present invention form covalent bonds upon application of UV light. It is further believed that some photoinitiators, such as Darocur 1173, or other UV-reactive materials that are present in the silicone when purchased from the manufacturer or when subsequently added, generate radicals that induce covalent bonding between the silicone and the adhesive when exposed to UV light.

EXAMPLES

In order to demonstrate practice of the present invention, samples of 7 laminates were prepared and treated with one of 11 dosages of UV light, and the force required for delamination—the release strength—was measured in N/inch. Table I indicates the release forces of various laminates measured at a peel rate of 300 mm/min; Table II indicates the release forces of various laminates measured at a peel rate of 80 m/min; Table III indicates the release forces measured after waiting 6 months before UV treatment; Table IV indicates the percent transmission of UV rays of various materials at various wavelengths; Table V indicates the release forces attained for various adhesives; Table VI indicates the release forces attained for various silicones and backing sheets.

The magnitude of the release strength depends on the composition of the adhesive used, the type of silicone used and the magnitude of the dose of UV radiation that reaches the adhesive-silicone interface. This dose of active UV rays in turn depends upon the composition of adhesive, silicone, face sheet and liner used; the intensity, duration and distance of the UV source from the interface; and the thickness of the various layers. Therefore, the following data are presented as examples of typical applications and their effect on release strength.

In the following tables, unless indicated otherwise, laminates were prepared as described in FIG. 1, wherein the face sheet is 60 micron clear, top-coated (TC) BOPP, the adhesive is about 20 g/m$^2$ of a mixture of about 82.5 weight percent Acronal V205 (BASF) and about 17.5 weight percent Snowtack 352A (Akzo-Nobel), the backing sheet is 50 micron BOPP, which can be obtained from UCB under the tradename Rayoweb CR 50, and the silicone, applied at about 1 g/m$^2$, has a weight ratio of Tego 726: Tego 711: Darocur 1173 (Th. Goldschmidt AG) of about 70:30:2. The siliconized liner, UV cured under nitrogen at 100 m/min and 240 W/cm, was laminated onto dried adhesive and stored for at least 16 hours before UV treatment.

The following samples were prepared:

Sample 1: UV on the BOPP backing sheet

Sample 2: UV on the face material 60 micron BOPP. (UV through face material and adhesive before reaching adhesive/silicone interface)

Sample 3: UV on the backing sheet, but with a 100 micron polyester film (Du Pont) between the lamp and the backing sheet Sample 4: UV on the backing sheet, but with two 50 micron BOPP films (UCB Rayoweb CR 50) between the lamp and the backing sheet Sample 5: UV on the bascking sheet, but with a 90 micron polyvinyl chloride (PVC) plasticized film between the lamp and the backing sheet Sample 6: UV on the backing sheet, but with a 100 micron polyethylene (PE) film between the lamp and the backing sheet Sample 7: UV on the backing sheet, but with two white 60 micron glassine liners (Sibille) between the lamp and the backing, sheet In addition, unless indicated otherwise, all of the samples in the following tables were irradiated for about 0.1 to about 10 seconds, depending on the speed at which a sample passed under the UV source, from a distance of about 15 cm using a single medium-pressure mercury lamp (Eltosch) emitting 150 W/cm. The following dosages were applied:

Dose A: 1×80 m/min

Dose B: 1×40 m/min

Dose C: 1×20 m/min

Dose D: 2×20 m/min

Dose E: 3×20 m/min

Dose F: 4×20 m/min

Dose G: 5×20 m/min

Dose H: 7×20 m/min

Dose I: 10×20 m/min

Dose J: 15×20 m/min

Dose K: 20×20 m/min wherein "2×20 m/min", for example, means that the sample was exposed to two successive passes under the UV source, moving at a speed of about 20 m/min. The samples were taped to an aluminum plate before UV treatment in order to avoid curling under the UV lamp. The tape was carefully applied outside the measured zones. The aluminum plate was cooled for about 30 seconds after each series of more than five passes in order to avoid an excessive heating of the samples. The distance between the UV lamp and laminate was about 15 cm for all tests. All samples were stored at room temperature in a drawer, away from any UV light.

Table I shows the force (N/inch) required to delaminate various samples at a peel rate of 300 mm/min. Delamination occurred either 3 days, 3 months, or 6 months after UV treatment. As a control or reference, the following release forces (N/inch) were measured without any exposure to UV light:

three days: 0.08–0.10 three months: 0.12–0.14 six months 0.16–0.18

In general, release forces increase with greater exposure to UV light and with longer time periods before delamination.

following release forces (N/inch) were measured without any exposure to UV light:

three days: 0.13–0.17 three months: 0.15–0.17 six months: 0.15–0.17

As in Table I, release forces increase with greater exposure to UV light and with larger time periods before delamination. Although the release forces are generally greater at the lower peel rate, Table I, the relationship between release force and UV exposure is substantially linear at both peel rates.

TABLE I

| Sample | Elapsed Time | Dose | | | | | | | | | | |
|---|---|---|---|---|---|---|---|---|---|---|---|---|
| | | A | B | C | D | E | F | G | H | I | J | K |
| 1 | 3 days | 0.40 | 0.55 | 1.50 | 3.0 | >10 | >10 | >10 | >10 | >10 | >10 | >10 |
| | 3 months | 0.42 | 0.69 | 1.69 | 3.6 | 5.3 | >10 | >10 | >10 | >10 | >10 | >10 |
| | 6 months | 0.59 | 0.84 | 1.9 | 4.0 | 7.5 | >10 | >10 | >10 | >10 | >10 | >10 |
| 2 | 3 days | 0.09 | 0.10 | 0.11 | 0.15 | 0.17 | 0.23 | 0.29 | 0.32 | 0.38 | 0.75 | 0.65 |
| | 3 months | 0.14 | 0.16 | 0.16 | 0.22 | 0.23 | 0.28 | 0.32 | 0.33 | 0.47 | 0.64 | 0.66 |
| | 6 months | 0.19 | 0.21 | 0.23 | 0.30 | 0.34 | 0.39 | 0.40 | 0.55 | 0.64 | 0.72 | 1.05 |
| 3 | 3 days | 0.10 | 0.10 | 0.10 | 0.10 | | | 0.10 | | | | 0.09 |
| | 3 months | 0.16 | 0.16 | 0.16 | 0.16 | | | 0.16 | | | | 0.16 |
| | 6 months | 0.25 | 0.24 | 0.25 | 0.25 | | | 0.26 | | | | 0.25 |
| 4 | 3 days | 0.15 | 0.10 | 0.37 | 0.65 | | | 3.0 | | | | >10 |
| | 3 months | 0.16 | 0.16 | 0.47 | 10. | | | 3.3 | | | | >10 |
| | 6 months | 0.31 | 0.25 | 0.63 | 1.2 | | | 3.2 | | | | >10 |
| 5 | 3 days | 0.10 | 0.10 | 0.10 | 0.11 | | | 0.11 | | | | 0.18 |
| | 3 months | 0.15 | | | | | | 0.16 | | | | 0.25 |
| | 6 months | 0.25 | | | | | | 0.25 | | | | 0.35 |
| 6 | 3 days | 0.17 | 0.27 | 0.80 | 2.20 | | | >10 | | | | >10 |
| | 3 months | 0.29 | 0.43 | 0.84 | 2.0 | | | >10 | | | | >10 |
| | 6 months | 0.39 | 0.57 | 1.3 | 2.5 | | | >10 | | | | >10 |
| 7 | 3 days | 0.10 | 0.10 | 0.10 | 0.10 | | | 0.10 | | | | 0.10 |
| | 3 months | 0.16 | 0.16 | 0.16 | 0.16 | | | 0.16 | | | | 0.16 |
| | 6 months | 0.29 | 0.30 | 0.29 | 0.31 | | | 0.30 | | | | 0.30 |

Table II shows the force required to delaminate the same samples and with the same dosage of UV light as found in Table I, but with a peel rate of 80 m/min. As a reference, the

TABLE II

| Sample | Elapsed Time | Dose | | | | | | | | | | |
|---|---|---|---|---|---|---|---|---|---|---|---|---|
| | | A | B | C | D | E | F | G | H | I | J | K |
| 1 | 3 days | 0.24 | 0.28 | 0.60 | 0.80 | 1.60 | 2.8 | 3.0 | 3.30 | 3.6 | 4.5 | 4.0 |
| | 3 months | 0.22 | 0.29 | 0.57 | 1.26 | 1.75 | 2.8 | 2.6 | 3.3 | 3.5 | 4.6 | 4.0 |
| | 6 months | 0.27 | 0.32 | 0.65 | 1.08 | 1.95 | 3.5 | 3.2 | 3.6 | 4.5 | 5.1 | 5.0 |
| 2 | 3 days | 0.14 | 0.15 | 0.16 | 0.16 | 0.17 | 0.17 | 0.18 | 0.20 | 0.23 | 0.25 | 0.30 |
| | 3 months | 0.17 | 0.17 | 0.18 | 0.17 | 0.17 | 0.19 | 0.20 | 0.23 | 0.25 | 0.27 | 0.30 |
| | 6 months | 0.19 | 0.19 | 0.20 | 0.20 | 0.22 | 0.22 | 0.24 | 0.25 | 0.27 | 0.31 | 0.35 |
| 3 | 3 days | 0.15 | 0.18 | 0.13 | 0.14 | | | 0.15 | | | | 0.19 |
| | 3 months | 0.17 | 0.17 | 0.16 | 0.17 | | | 0.19 | | | | 0.17 |
| | 6 months | 0.20 | 0.21 | 0.20 | 0.22 | | | 0.21 | | | | 0.20 |
| 4 | 3 days | 0.17 | 0.12 | 0.23 | 0.33 | | | 0.72 | | | | 3.10 |

TABLE II-continued

| Sample | Elapsed Time | Dose |  |  |  |  |  |  |  |  |  |
|---|---|---|---|---|---|---|---|---|---|---|---|
| | | A | B | C | D | E | F | G | H | I | J | K |
| | 3 months | 0.19 | 0.18 | 0.25 | 0.37 | | | 0.80 | | | | 2.9 |
| | 6 months | 0.20 | 0.21 | 0.26 | 0.42 | | | 0.89 | | | | 3.4 |
| 5 | 3 days | 0.15 | 0.16 | 0.16 | 0.17 | | | 0.17 | | | | 0.20 |
| | 3 months | 0.15 | 0.15 | 0.17 | 0.17 | | | 0.17 | | | | 0.18 |
| | 6 months | 0.20 | 0.21 | 0.21 | 0.22 | | | 0.21 | | | | 0.26 |
| 6 | 3 days | 0.19 | 0.25 | 0.39 | 0.63 | | | 1.69 | | | | 4.0 |
| | 3 months | 0.22 | 0.28 | 0.37 | 0.65 | | | 1.74 | | | | 3.0 |
| | 6 months | 0.25 | 0.35 | 0.45 | 0.74 | | | 1.9 | | | | 3.7 |
| 7 | 3 days | 0.18 | 0.18 | 0.18 | 0.16 | | | 0.17 | | | | 0.17 |
| | 3 months | 0.17 | 0.17 | 0.18 | 0.17 | | | 0.18 | | | | 0.18 |
| | 6 months | 0.20 | 0.20 | 0.21 | 0.20 | | | 0.20 | | | | 0.20 |

FIG. 7a shows the change in the release strength of samples 1, 2, 4, and 6 of Tables I and II at a peel rate of 300 mm/min as a function of UV dose. FIG. 7b shows the change in the release strength of the same samples at a peel rate of 80 m/min. For each sample the slope reflects the high controllability of the release strengths; each additional dose of UV light induces a moderate increase in release strength with a final release strength ten times, or more, the initial release strength. Therefore, accurate, reproducible release strengths can be readily obtained by carefully controlling the UV dose.

Table III indicates the release strength (N/inch) attained after waiting six months before UV treatment. Sample 1 was irradiated at various UV doses and release forces were measured three hours later at two different peel rates. The six month hiatus only caused a slight elevation in release forces.

TABLE III

| Peel Rate | Dose |  |  |  |  |  |  |  |  |  |  |
|---|---|---|---|---|---|---|---|---|---|---|---|
| | A | B | C | D | E | F | G | H | I | J | K |
| 300 mm/min | 0.41 | 0.80 | 2.0 | >10 | >10 | >10 | >10 | >10 | >10 | >10 | >10 |
| 80 m/min | 0.25 | 0.35 | 0.67 | 1.06 | 1.64 | 2.4 | 2.6 | 3.3 | 3.75 | 5.0 | 5.3 |

Table IV indicates the percent transmission of UV rays of various materials at various wavelengths. Samples of face sheets, backing sheets, and adhesives were treated with different wavelengths of UV light, ranging from about 200 to about 370 nm. The percent transmission was then measured using a spectrophotometer (Perkin-Elmer 124).

TABLE IV

| Material | Wavelength (nm) |  |  |  |
|---|---|---|---|---|
| | 200–240 | 240–300 | 300–320 | 320–370 |
| | Percent Transmission | | | |
| BOPP 50 microns (UCB CR 50) | 10 | 60 | 75 | 80 |
| BOPP 60 microns TC | 10 | 60 | 75 | 80 |
| PET 36 microns | 0 | 0 | 0 | 35 |
| Glassine 62 g | 0 | 0 | 0 | 0 |
| Acrylic solvent-based adhesive (30 g/m$^2$) | 0 | 35 | 45 | 50 |
| Acrylic hot melt Acronal 3458 (30 g/m$^2$) | 0 | 35 | 45 | 50 |
| Rubber adhesive hot melt (20 g/m$^2$) | 0 | 0 | 20 | 50 |

Table V indicates the release forces attained for various adhesives. The following adhesives were tested:
Adhesive A: solvent-based acrylic with a tackifier
Adhesive B: solvent-based acrylic without a tackifier
Adhesive C: water-based acrylic (emulsion) without a tackifier
Adhesive D: water-based acrylic without a tackifier
Adhesive E: solvent-based rubber with a tackifier
Adhesive F: hot melt rubber with a tackifier
Adhesive G: hot melt acrylic (Acronal 3458)

The release forces were measured after applying no UV light (control) or applying UV light at 2×20 m/min or 10×20 m/min to the various adhesives. For adhesives A–F, the UV rays were sent through the 50 micron BOPP liner. For adhesive G, however, three different treatments were employed. Treatment (i) was the same as that for adhesives A–F. Treatment (ii) entailed applying the UV light to the 60 micron BOPP face sheet. Treatment (iii) was similar to treatment (ii), but Tego 706 was substituted for Tego 726 in the silicone. It should be noted that in treatments (ii) and (iii) the UV rays must pass through both the BOPP face sheet and the adhesive. With the exception of adhesive F, all of the tested adhesives indicated strong bonding to the silicone layer upon exposure to UV light.

TABLE V

| Adhesive | Peel Rate | Dose [None] | D | I |
|---|---|---|---|---|
| A | 300 mm/min | 0.07 | 2 | 5.5 |
| | 80 m/min | 0.19 | 1.42 | >6 |
| B | 300 mm/min | 0.07 | 2.5 | 4.5 |
| | 80 m/min | 0.17 | 2.1 | >6 |
| C | 300 mm/min | 0.06 | 2 | >6 |
| | 80 m/min | 0.11 | 0.69 | >6 |
| D | 300 mm/min | 0.05 | 3.6 | 3.8 |
| | 80 m/min | 0.2 | 3 | >6 |
| E | 300 mm/min | 0.1–0.3 | 1.9 | 1.9 |
| | 80 m/min | 0.11 | 0.36 | 0.43 |
| F | 300 mm/min | 0.05–0.2 | 0.2–0.4 | 0.1–0.4 |

TABLE V-continued

| Adhesive | Peel Rate | Dose | [None] | D | I |
|---|---|---|---|---|---|
| | 80 m/min | | 0.04 | 0.13 | 0.14 |
| G(i) | 300 mm/min | | 0.1 | 3 | >6 |
| | 80 m/min | | 0.12 | 1.31 | >6 |
| G(ii) | 300 mm/min | | 0.1 | 1.4 | 3 |
| | 80 m/min | | 0.25 | 0.68 | 2.07 |
| G(iii) | 300 mm/min | | 0.5 | 0.8 | 1.5 |
| | 80 m/min | | 0.39 | 0.52 | 0.73 |

Table VI reflects the release strength attained for various silicones and backing sheets. Standard laminates were prepared with substitutions for the backing sheet and/or the silicone, as indicated. The release strength of each sample was measured at a peel rate of 300 mm/min after a dose of UV light either through the face sheet or the backing sheet. The following abbreviations have been used:

GS medium: a mixture of Tego 706: Tego 711: Darocur 1173 (70:30:2)
GS low: a mixture of Tego 726: Tego 711: Darocur 1173 (70:30:2)
RP: a thermal solventless silicone from Rhone-Poulenc
DC: a thermal solvent-based silicone from Dow Corning
Han. 5515: a 130 g/m² clay-coated paper from Hannover Paper.

It appears from the data that when UV light can reach the adhesive-silicone interface, release forces sharply increase, but only for the Goldschmidt silicone.

TABLE VI

| Silicone | Backing | no UV (reference) | UV on face (2 × 20 m/min) | UV on face (10 × 20 m/min) | UV on backing (2 × 20 m/min) | UV on backing (10 × 20 m/min) |
|---|---|---|---|---|---|---|
| GS medium | Glassine 65 g | 0.35 | 0.35 | 0.55 | 0.3 | 0.6 |
| GS medium | Han 5515 | 0.5 | 0.6 | 1 | 0.4 | 0.5 |
| GS low | Glassine 65 g | 0.04 | 0.12 | 0.6 | 0.18 | 1.1 |
| GS low | BOPP 50 µ | 0.06 | 0.07 | 0.22 | 1.5 | >10 |
| RP | Han 5515 | 0.04 | 0.05 | 0.07 | 0.05 | 0.05 |
| DC | Glassine 65 g | 0.07 | 0.1 | 0.1 | 0.06 | 0.04 |

Based upon the foregoing disclosure, it should now be apparent that the laminate described herein will carry out the objects set forth hereinabove. While in accordance with the patent statutes only the best mode and preferred embodiments of the invention have been presented and described in detail, the invention is not limited thereto or thereby. Accordingly, for an appreciation of the scope and breadth of the invention, reference should be made to the following claims.

What is claimed is:

1. A pressure-sensitive adhesive laminate comprising:

an adhesive layer and a first release coating contacting the adhesive layer, the first release coating and the adhesive layer being separable, the force required to separate the adhesive layer and the first release coating being set by application of ultraviolet light to an interface between the adhesive layer and the first release coating.

2. The laminate according to claim 1, further comprising a first face sheet, wherein the first face sheet contacts a side of the adhesive layer opposite the first release coating.

3. The laminate according to claim 2, further comprising a second release coating interposed between said first face sheet and the adhesive layer, and a second face sheet contacting a side of the first release coating.

4. The laminate according to claim 1, further comprising a backing sheet contacting a side of the first release coating opposite the adhesive layer.

5. The laminate according to claim 1, wherein the force required to separate the adhesive layer and the first release coating is a function of the number of successive applications of UV light to the interface between the adhesive layer and the first release coating at least until the force exceeds the force prior to any UV application by a factor of 10.

6. The laminate according to claim 1, further comprising a UV-reactive material at the interface between the first release coating and the adhesive layer.

7. The laminate according to claim 6, wherein the UV-reactive material is in the first release coating.

8. The laminate according to claim 1, wherein the first release coating comprises silicone.

9. The laminate according to claim 8, wherein the first release coating comprises an aczylated silicone.

* * * * *